(12) United States Patent
Oprins et al.

(10) Patent No.: US 10,160,925 B2
(45) Date of Patent: Dec. 25, 2018

(54) METHOD OF CONTROLLING THE SUPPLY AND ALLOCATION OF HYDROGEN GAS IN A HYDROGEN SYSTEM OF A REFINERY INTEGRATED WITH OLEFINS AND AROMATICS PLANTS

(71) Applicants: Saudi Basic Industries Corporation, Riyadh (SA); SABIC Global Technologies B.V., PX Bergen Op Zoom (NL)

(72) Inventors: Arno Johannes Maria Oprins, Geleen (NL); Andrew Mark Ward, Wiltshire (GB); Egidius Jacoba Maria Schaerlaeckens, Geleen (NL); Raúl Velasco Pelaez, Geleen (NL); Ravichander Narayanaswamy, Bangalore (IN); Vijayanand Rajagopalan, Bangalore (IN); Joris Van Willigenburg, Geleen (NL)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/120,853

(22) PCT Filed: Dec. 23, 2014

(86) PCT No.: PCT/EP2014/079223
§ 371 (c)(1),
(2) Date: Aug. 23, 2016

(87) PCT Pub. No.: WO2015/128042
PCT Pub. Date: Sep. 3, 2015

(65) Prior Publication Data
US 2017/0058213 A1 Mar. 2, 2017

(30) Foreign Application Priority Data

Feb. 25, 2014 (EP) .................... 14156632

(51) Int. Cl.
$C10G\ 69/00$ (2006.01)
$C10G\ 9/00$ (2006.01)
(Continued)

(52) U.S. Cl.
CPC ............... $C10G\ 69/00$ (2013.01); $C10G\ 9/00$ (2013.01); $C10G\ 11/02$ (2013.01); $C10G\ 35/04$ (2013.01);
(Continued)

(58) Field of Classification Search
None
See application file for complete search history.

(56) References Cited

U.S. PATENT DOCUMENTS 3,972,804 A   8/1976  McLaughlin et al.
4,056,575 A  11/1977  Gregory et al.
(Continued)

FOREIGN PATENT DOCUMENTS

CN    101268170       9/2008
EP    0192059 A1      8/1986
(Continued)

OTHER PUBLICATIONS

Ahmed, M. I. et al., "Modelling and Optimisation for Design of Hydrogen Networks for Multi-Period Operation" Journal of Cleaner Production, Elsevier, NL, vol. 18, No. 9, Jun. 1, 2010, pp. 889-899.
(Continued)

*Primary Examiner* — Tam M Nguyen
(74) *Attorney, Agent, or Firm* — Norton Rose Fulbright US LLP

(57) ABSTRACT

A method of controlling the supply and allocation of hydrogen gas in a hydrogen system of a refinery integrated with
(Continued)

olefins and aromatics plants to convert crude oil into petrochemicals. The method includes one or more supply sources that provide hydrogen at individual rates, purities, pressures and costs, multiple consumption sites that consume hydrogen at individual rates, purities and pressures and an interconnecting hydrogen distribution network. The method further includes the integration of hydrogen consuming process units with hydrogen producing process units in which hydrogen recovered from the effluents from the hydrogen consuming process units and hydrogen recovered from the hydrogen producing process units are re-used in the hydrogen consuming process units.

18 Claims, 3 Drawing Sheets

(51) Int. Cl.
    *C10G 35/04*     (2006.01)
    *C10G 45/58*     (2006.01)
    *C10G 69/04*     (2006.01)
    *C10G 69/06*     (2006.01)
    *C10G 47/00*     (2006.01)
    *C10G 49/26*     (2006.01)
    *C10G 69/10*     (2006.01)
    *C10G 11/02*     (2006.01)
    *C10G 45/02*     (2006.01)
    *C10G 45/44*     (2006.01)

(52) U.S. Cl.
    CPC ............ *C10G 45/02* (2013.01); *C10G 45/44* (2013.01); *C10G 45/58* (2013.01); *C10G 47/00* (2013.01); *C10G 49/26* (2013.01); *C10G 69/04* (2013.01); *C10G 69/10* (2013.01); *C10G 2300/42* (2013.01); *C10G 2400/20* (2013.01); *C10G 2400/30* (2013.01)

(56) References Cited

U.S. PATENT DOCUMENTS

| | | | |
|---|---|---|---|
| 4,137,147 A | 1/1979 | Franck et al. | |
| 4,157,356 A | 6/1979 | Bulford et al. | |
| 4,180,689 A | 12/1979 | Davies et al. | |
| 4,547,284 A | 10/1985 | Sze et al. | |
| 4,827,072 A | 5/1989 | Imai et al. | |
| 4,926,005 A | 5/1990 | Olbrich et al. | |
| 6,153,087 A | 11/2000 | Bigeard et al. | |
| 6,270,654 B1 | 8/2001 | Colyar et al. | |
| 7,019,188 B2 | 3/2006 | Smith et al. | |
| 7,214,308 B2 | 5/2007 | Colyar | |
| 7,513,988 B2 | 4/2009 | Oballa et al. | |
| 7,622,623 B2 | 11/2009 | Fridman et al. | |
| 7,704,377 B2 | 4/2010 | Duddy et al. | |
| 7,938,952 B2 | 5/2011 | Colyar et al. | |
| 8,926,824 B2 | 1/2015 | Morel | |
| 9,005,430 B2 | 4/2015 | Fournier et al. | |
| 9,840,674 B2 | 12/2017 | Weiss et al. | |
| 2005/0101814 A1 | 5/2005 | Foley et al. | |
| 2006/0287561 A1 | 12/2006 | Choi et al. | |
| 2007/0108036 A1 | 5/2007 | Siskin et al. | |
| 2008/0093262 A1 | 4/2008 | Gragnani et al. | |
| 2012/0024752 A1 | 2/2012 | Chen et al. | |
| 2014/0299515 A1 | 10/2014 | Weiss et al. | |
| 2016/0122666 A1 | 5/2016 | Weiss et al. | |

FOREIGN PATENT DOCUMENTS

| | | |
|---|---|---|
| GB | 2162082 A | 1/1986 |
| JP | S58-98387 | 6/1983 |
| JP | S60-4136 | 1/1985 |
| WO | 2002044306 A1 | 6/2002 |
| WO | 2004013095 A2 | 2/2004 |
| WO | 2005008515 A1 | 1/2005 |
| WO | 2007055488 A1 | 5/2007 |
| WO | WO 2013/112969 | 8/2013 |
| WO | WO 2013/112970 | 8/2013 |
| WO | WO 2016/146326 | 9/2016 |

OTHER PUBLICATIONS

International Search Report and Written Opinion of corresponding International Application No. PCT/EP2014/079223, dated Mar. 25, 2015; 12 pages.
Office Action issued in Chinese Application No. 201480076218.3, dated Dec. 12, 2017.
Kapustin et al., "Petroleum Refinery Technology. Part 2. Destructive Processes." Moscow: KolosS, 2008, p. 277. (English Translation).
Office Action issued in Eurasian Patent Application No. 201691718, dated Jul. 17, 2018.
Office Action issued in Corresponding Japanese Patent Application No. 2016-553856, dated Nov. 6, 2018 (Machine Translation)

METHOD OF CONTROLLING THE SUPPLY AND ALLOCATION OF HYDROGEN GAS IN A HYDROGEN SYSTEM OF A REFINERY INTEGRATED WITH OLEFINS AND AROMATICS PLANTS

CROSS-REFERENCE TO RELATED APPLICATIONS

This application is a national phase under 35 U.S.C. § 371 of International Application No. PCT/EP2014/079223, filed Dec. 23, 2014, which claims the benefit of priority to European Application No. 14156632.3, filed Feb. 25, 2014, the entire contents of each of which are hereby incorporated by reference in their entirety.

TECHNICAL FIELD AND BACKGROUND OF THE INVENTION

The present invention relates to a method of controlling the supply and allocation of hydrogen gas in a hydrogen system of a refinery integrated with olefins and aromatics plants to convert crude oil into petrochemicals. More in detail the present invention relates to a process for converting hydrocarbons into olefins and BTXE, the converting process comprising the integration of hydrogen consuming process units with hydrogen producing process units.

US Patent application No 2012/024752 relates to a multi-stage integrated process for the production of high octane naphtha from a hydrocarbonaceous feedstock, comprising isolating a hydrocracked naphtha from a hydrocracking reaction zone effluent, providing at least a portion of the hydrocracked naphtha to a reforming reaction zone containing a reforming catalyst, contacting the at least a portion of the hydrocracked naphtha with the reforming catalyst at reforming reaction conditions and producing a hydrogen-rich stream and a reformed naphtha, and d. passing the hydrogen-rich stream to the hydrocracking reaction zone. This reference does not refer to specific olefins generating plants. The hydrocracking reaction conditions are established to achieve a target conversion of greater than 30% of the hydrocarbonaceous feedstock within the hydrocracking reaction zone, wherein the value of 30% is based on conversion of the hydrocarbonaceous feedstock to naphtha.

U.S. Pat. No. 3,972,804 relates to a method for controlling the hydrogen/hydrocarbon mole ratio and the control system in processes for the catalytic conversion of hydrocarbons in a hydrogen-containing atmosphere, in which processes the consumption of hydrogen occurs, namely hydrogen control system of a single hydrogen consuming unit. In all these processes, as in most hydrogen-producing processes such as catalytic reforming, a commonly-practiced technique involves the utilization of a hydrogen-rich vaporous phase recycled to combine with the fresh hydrocarbon charge to the reaction zone. According to this reference a charge stock composition or a product composition characteristic is sensed and the hydrogen concentration within the vaporous phase introduced into the reaction zone with the feed stock is sensed. Appropriate representative output signals are transmitted to a comparator/computer which in turn generates computer output signals which are transmitted as required to adjust reaction zone severity (temperature and pressure), charge stock flow and recycle gas flow in order to regulate the hydrogen/hydrocarbon mole ratio while simultaneously achieving the desired product quality and/or quantity. With respect to hydrogen-consuming processes comparator output signals are transmitted to regulate the quantity of make-up hydrogen introduced into the process from an external source and the flow of any required reaction zone temperature quench stream. In a hydrogen-consuming process, such as hydrocracking, that portion of the separated reaction zone effluent, containing hydrogen is insufficient, and must be supplemented by make-up hydrogen from a suitable source external of the process—i.e., catalytic reforming which produces an abundance of hydrogen.

The article "Modelling and optimisation for design of hydrogen networks for multi-period operation", Ahmad M. I. et al, Journal of cleaner production, Elsevier, NL, vol. 18, no. 9, 1 Jun. 2010 (2010-06-01), pages 889-899 relates to a design of flexible hydrogen networks that can remain optimally operable under multiple periods of operation, also identified as flexibility. This reference only refers to refinery operations. The proposed methodology for multi-period design of hydrogen networks can take into account pressure differences, maximum capacity of existing equipment, and optimal placement of new equipment such as compressors. A hydrogen network may be described as a system of refinery processes that interact with each other through distribution of hydrogen. These refinery processes may be classified into two categories, i.e. hydrogen producers and hydrogen consumers, based on their contribution to the hydrogen network. Hydrogen producers are units that supply hydrogen to the hydrogen distribution system, such as the hydrogen plant and catalytic reforming unit. The catalytic reforming process produces hydrogen as a by-product of cyclisation and dehydrogenation reactions of hydrocarbon molecules to increase the aromatic content and the octane number of naphtha products. Hydrogen consumers are conversion processes, such as the hydrocracking process for upgrading heavy hydrocarbon fractions, hydrotreating processes to satisfy cleaner fuel specifications, lubricant plants, the isomerization process and the hydrodealkylation units. These processes employ hydrogen as a reactant to upgrade the quality of refinery products. Amongst all the hydrogen consuming processes hydrocracking and hydrotreating processes are the major hydrogen consumers.

US patent application No. 2006/287561 relates to a process for increasing the production of C2-C4 light olefin hydrocarbons by integrating a process for producing an aromatic hydrocarbon mixture and liquefied petroleum gas (LPG) from a hydrocarbon mixture and a process for producing a hydrocarbon feedstock which is capable of being used as a feedstock in the former process.

U.S. Pat. No. 4,137,147 relates to a process for manufacturing ethylene and propylene from a charge having a distillation point lower than about 360 DEG C. and containing at least normal and iso-paraffins having at least 4 carbon atoms per molecule, wherein: the charge is subjected to a hydrogenolysis reaction in a hydrogenolysis zone, in the presence of a catalyst, (b) the effluents from the hydrogenolysis reaction are fed to a separation zone from which are discharged (i) from the top, methane and possibly hydrogen, (ii) a fraction consisting essentially of hydrocarbons with 2 and 3 carbon atoms per molecule, and (iii) from the bottom, a fraction consisting essentially of hydrocarbons with at least 4 carbon atoms per molecule, (c) only the fraction consisting essentially of hydrocarbons with 2 and 3 carbon atoms per molecule is fed to a steam-cracking zone, in the presence of steam, to transform at least a portion of the hydrocarbons with 2 and 3 carbon atoms per molecule to monoolefinic hydrocarbons; the fraction consisting essentially of hydrocarbons with at least 4 carbon atoms per molecule, obtained from the bottom of the separation zone, is supplied to a second hydrogenolysis zone where it is treated in the presence of a catalyst, the effluent from the second hydrogenolysis zone is supplied to a separation zone to discharge, on the one hand, hydrocarbons with at least 4 carbon atoms per molecule which are recycled at least partly to the second hydrogenolysis zone, and, on the other hand, a fraction consisting essentially of a mixture of hydrogen, methane and saturated hydrocarbons with 2 and 3 carbon atoms per molecule; a hydrogen stream and a methane stream are separated from the mixture and there is fed to the steam-cracking zone the hydrocarbons of the mixture with 2 and 3 carbon atoms, together with the fraction consisting essentially of hydrocarbons with 2 and 3 carbon atoms per molecule as recovered from the separation zone following the first hydrogenolysis zone. At the outlet of the steam-cracking zone are thus obtained, in addition to a stream of methane and hydrogen and a stream of paraffinic hydrocarbons with 2 and 3 carbon atoms per molecule, olefins with 2 and 3 carbon atoms per molecule and products with at least 4 carbon atoms per molecule.

US Patent application No 2005/101814 relates to a process for improving the paraffin content of a feedstock to a steam cracking unit, comprising: passing a feedstream comprising C5 through C9 hydrocarbons including C5 through C9 normal paraffins into a ring opening reactor, the ring opening reactor comprising a catalyst operated at conditions to convert aromatic hydrocarbons to naphthenes and a catalyst operated at conditions to convert naphthenes to paraffins, and producing a second feedstream; and passing at least a portion of the second feedstream to a steam cracking unit. The ring opening reactor includes hydrogenation for converting aromatic compounds to naphthenes. Hydrogen is supplied to the ring opening reactor for the hydrogenation wherein one source of hydrogen available to use in the ring opening reactor is from the steam cracking unit generating hydrogen as a byproduct of the cracking process. The ring opening process stream can be passed to the steam cracking unit for conversion of the paraffins to ethylene and propylene, and the steam cracking unit, in addition to generating light olefins, generates a by-product known as pyrolysis gasoline (py-gas), wherein the py-gas leaving the steam cracking unit is passed to the ring opening reactor for increasing the light olefin production from a naphtha feedstream.

Conventionally, crude oil is processed, via distillation, into a number of cuts such as naphtha, gas oils and residua. Each of these cuts has a number of potential uses such as for producing transportation fuels such as gasoline, diesel and kerosene or as feeds to some petrochemicals and other processing units.

Light crude oil cuts such as naphtha and some gas oils can be used for producing light olefins and single ring aromatic compounds via processes such as steam cracking in which the hydrocarbon feed stream is evaporated and diluted with steam and then exposed to a very high temperature (750° C. to 900° C.) in short residence time (<1 second) furnace (reactor) tubes. In such a process the hydrocarbon molecules in the feed are transformed into (on average) shorter molecules and molecules with lower hydrogen to carbon ratios (such as olefins and aromatics) when compared to the feed molecules. This process also generates hydrogen as a useful by-product and significant quantities of lower value co-products such as methane and C9+ Aromatics and condensed aromatic species (containing two or more aromatic rings which share edges).

Typically, the heavier (or higher boiling point) aromatic species, such as residua are further processed in a crude oil refinery to maximize the yields of lighter (distillable) products from the crude oil. This processing can be carried out by processes such as hydro-cracking (whereby the hydro-cracker feed is exposed to a suitable catalyst under conditions which result in some fraction of the feed molecules being broken into shorter hydrocarbon molecules with the simultaneous addition of hydrogen). Heavy refinery stream hydrocracking is typically carried out at high pressures and temperatures and thus has a high capital cost.

An aspect of such a combination of crude oil distillation and steam cracking of the lighter distillation cuts is the capital and other costs associated with the fractional distillation of crude oil. Heavier crude oil cuts (i.e. those boiling beyond ~350° C.) are relatively rich in substituted aromatic species and especially substituted condensed aromatic species (containing two or more aromatic rings which share edges) and under steam cracking conditions these materials yield substantial quantities of heavy by products such as C9+ aromatics and condensed aromatics. Hence, a consequence of the conventional combination of crude oil distillation and steam cracking is that a substantial fraction of the crude oil is not processed via the steam cracker as the cracking yield of valuable products from heavier cuts is not considered to be sufficiently high, compared to the alternative refinery fuel value.

Another aspect of the technology discussed above is that even when only light crude oil cuts (such as naphtha) are processed via steam cracking a significant fraction of the feed stream is converted into low value heavy by-products such as C9+ aromatics and condensed aromatics. With typical naphthas and gas oils these heavy by-products might constitute 2 to 25% of the total product yield (Table VI, Page 295, Pyrolysis: Theory and Industrial Practice by Lyle F. Albright et al, Academic Press, 1983). Whilst this represents a significant financial downgrade of expensive naphtha and/or gas oil in lower value material on the scale of a conventional steam cracker the yield of these heavy by-products does not typically justify the capital investment required to up-grade these materials (e.g. by hydrocracking) into streams that might produce significant quantities of higher value chemicals. This is partly because hydrocracking plants have high capital costs and, as with most petrochemicals processes, the capital cost of these units typically scales with throughput raised to the power of 0.6 or 0.7. Consequently, the capital costs of a small scale hydrocracking unit are normally considered to be too high to justify such an investment to process steam cracker heavy by-products.

Another aspect of the conventional hydrocracking of heavy refinery streams such as residua is that these are typically carried out under compromise conditions chosen to achieve the desired overall conversion. As the feed streams contain a mixture of species with a range of ease of cracking this result in some fraction of the distillable products formed by hydrocracking of relatively easily hydrocracked species being further converted under the conditions necessary to hydrocrack species more difficult to hydrocrack. This increases the hydrogen consumption and heat management difficulties associated with the process. This also increases the yield of light molecules such as methane at the expense of more valuable species.

Refineries process crude oils into fuels such as gasoline, kerosene, diesel and fuel oils. The crude is distilled into fractions as naphtha, middle distillates, gasoils and residues. Some or all of the heavier fraction of the crude oils (gasoils and residua), may be upgraded to less heavy fractions by means of processes like fluid catalytic cracking, hydrocracking, and delayed coking.

The overall hydrogen gas mass balance in a refinery is critical for the product slate composition that can be achieved. Some refinery processes consume hydrogen gas (hydrodesulphurization, hydro-dearomatization and hydrocracking).

The hydrogen consumption is closely linked to the quality and composition of the feed: feeds with a high contaminant content, such as those with a higher concentration of unsaturated composites (for example, fractions from thermal processes, which have a significant level of olefinic compounds) lead to greater hydrogen consumption.

Some refinery units also generate hydrogen gas (e.g. catalytic reforming). In general refineries are short in hydrogen gas. The required deficit of hydrogen gas may be obtained by means of processes like steam reforming, partial oxidation of methane or gasification of the residue, or obtained from a hydrogen gas grid.

Steam cracking is a petrochemical process in which saturated hydrocarbons are broken down into smaller, often unsaturated, hydrocarbons. It is the principal industrial method for producing the lighter alkenes (or commonly olefins), including ethylene and propylene, and light aromatics. Steam cracker units are facilities in which a feedstock such as naphtha, liquefied petroleum gas (LPG), ethane, propane or butane is thermally cracked through the use of steam in a bank of pyrolysis furnaces to produce lighter hydrocarbons like olefins and light aromatics. Steam cracking also produces hydrogen gas and methane. A steam cracker consumes a small amount of its own hydrogen for hydrogenation and recycling of heavier olefins. The excess hydrogen is mainly downgraded to fuel or exported.

Propane dehydrogenation converts propane into propylene and by-product hydrogen. The propylene from propane yield is about 85-90 wt. %. Reaction by-products (mainly hydrogen) are usually used as fuel for the propane dehydrogenation reaction. As a result, propylene tends to be the only product, unless local demand exists for hydrogen. Feed hydrocracking cracking/gasoline hydrocracking (FHC/GHC) are processes which hydrocrack naphtha fractions or gasoline fractions into methane, LPG and light aromatics. Aromatic ring opening processes are able to saturate and hydrocrack multi-aromatic compounds and hydrodealkylate the remaining mono aromatic compounds.

In recent decades environmental policies and the new organization of the fuel and light-distillates market have led to significant growth in the demand for hydrogen and the introduction of considerable modifications to the production and technology aspects of refineries. Some factors increasing the demand for hydrogen are for example: the need to process increasingly heavy feeds, with a consequent increase in the level of sulphur conversion and removal, the greater restrictions imposed by environmental regulations on the sulphur content in gasolines and diesel, the increasing market reduction in the demand for high sulphur content fuel, which has made it necessary to convert the residues, which are no longer used as fuel oils, into lighter products.

BRIEF SUMMARY OF THE INVENTION

An aspect of the present invention is thus to provide a method for converting hydrocarbons into olefins and BTXE in which method the hydrogen economics are well controlled.

The present invention thus relates to a method of controlling the supply and allocation of hydrogen gas in a hydrogen system of a refinery integrated with olefins and aromatics plants to convert crude oil into petrochemicals, comprising one or more supply sources that provide hydrogen at individual rates, purities, pressures and costs, multiple consumption sites that consume hydrogen at individual rates, purities and pressures and an interconnecting hydrogen distribution network, said method comprising the integration of hydrogen consuming process units with hydrogen producing process units, wherein both hydrogen recovered from the effluents from the hydrogen consuming process units and hydrogen recovered from the hydrogen producing process units are re-used in the hydrogen consuming process units, wherein a crude oil fraction is used as a feed for the hydrogen consuming process units, wherein at least 25 wt. % of said feed is converted into a low boiling hydrocarbon fraction comprising ethane, propane and butanes, wherein said hydrogen producing process units comprise a steam cracking unit and one or more units chosen from the group of propane dehydrogenation unit (PDH), butane dehydrogenation unit (BDH) and combined PDH and BDH unit.

The present inventors found that the integration of refinery units and olefin plants, especially a steam cracking unit and one or more units chosen from the group of propane dehydrogenation unit (PDH), butane dehydrogenation unit (BDH) and combined PDH and BDH unit, can be profitable with regard to overall product slate integration and hydrogen gas balancing.

According to a preferred embodiment at least 50 wt. %, preferably 70 wt. %, of the crude oil fraction feed is converted into a low boiling hydrocarbon fraction comprising ethane, propane and butanes. This conversion relates to the formation of LPG, i.e. ethane, propane and butanes, whereas other prior art references refer to the formation of naphtha, namely the conversion of a hydrocarbonaceous feedstock to naphtha.

The present method further preferably comprises setting cut points of one or more separation units, such as distillation units, setting operation conditions of hydrogen consuming process units and setting operation conditions of hydrogen producing process units in a process control system, wherein the values of said cut points and operation conditions are such that said supply and allocation of hydrogen gas in a hydrogen system of a refinery is controlled. For example, the cut point setting of a distillation tower determines the amount and composition of the top stream, side streams and bottom stream. And this differentiation of streams will have an influence on the product slate of downstream process units, such as hydrocrackers, for example the amount of tar or pitch. In addition, operation conditions of hydrogen consuming process units will have an influence on the product slate as well. For example, changing the operation conditions of a hydrocracker may lead to the formation of more aromatics, or may even lead to the formation of LPG (more severe conditions). And this will have an influence on the amount of hydrogen required.

With additional processes like naphtha hydrocracking and aromatic ringopening, a selection of refinery streams can be converted into mainly LPG and BTX. The LPG (also containing hydrogen and fuel) can be separated in a cryogenic+distillation gas separation system into an ethane stream, propane stream and butanes stream (also yielding fuel and hydrogen gas with a purity of 95 moles %). The ethane stream is preferably processed in an ethane steam cracker, i.e. a gas steam cracker, to yield ethylene. The propane and butane are preferably processed in dehydrogenation units to yield propylene and butylenes. The processing of the ethane, propane and butanes yields additional hydrogen gas which is required for the hydrodesulphurization, hydro-dearomatization and hydrocracking in the refinery units and in the feed hydrocracking/gasoline hydrocracking (FHC/GHC) processes and ring opening processes. The effluents from the steam cracker and dehydrogenation units are separated in a coldbox/distillation separation system to separate their products from the fuel and hydrogen (with a hydrogen purity of 95 mole %). It is preferred to process propane in a propane dehydrogenation process resulting in considerable more hydrogen and less methane than steam cracking of propane.

The hydrogen producing process units comprise steam cracking unit and one or more units chosen from the group of propane dehydrogenation unit (PDH), butane dehydrogenation unit (BDH) and combined PDH and BDH unit. In addition, in a preferred embodiment the hydrogen producing process units further comprise one or more units chosen from the group of catalytic naphtha reformer unit and LPG aromatization unit.

The hydrogen consuming process units preferably comprise one or more units chosen from the group of feed hydrocracking unit, aromatic ring opening unit, resid hydrocracking unit, gasoil-hydrocracking unit, gasoline hydrocracker unit, hydrodesulphurization unit, hydro-dearomatization unit and hydro-dealkylation unit.

The present method is further characterized in that the method further comprises:

feeding a crude oil fraction together with hydrogen to one or more hydrogen consuming units;

separating the effluent(s) from said one or more hydrogen consuming units into one or more streams comprising methane, ethane, propane, butane, pitch and BTX;

feeding said one or more streams comprising ethane, propane and butane to one or more hydrogen producing units for producing one or more streams comprising olefins, BTX, methane and hydrogen;

integrating said stream comprising hydrogen originating from said hydrogen producing units into said hydrogen stream(s) to be fed to said one or more hydrogen consuming units, wherein at least 25 wt. % of said crude oil fraction is converted into a low boiling hydrocarbon fraction comprising ethane, propane and butanes, wherein said hydrogen producing process units comprise a steam cracking unit and one or more units chosen from the group of propane dehydrogenation unit (PDH), butane dehydrogenation unit (BDH) and combined PDH and BDH unit.

In such an embodiment there is a complete integration of refinery units and olefin plants which integration can be profitable with regard to overall product slate integration and hydrogen gas balancing. The "circle between the refinery units and olefin plants" is closed by the hydrogen loop. However, the present method is not restricted to a complete zero hydrogen balance because hydrogen from units outside the circle may be used when there is shortage of hydrogen. In addition, when the demand for hydrogen is low, the hydrogen produced in the circle may be sent to other units. Thus the method further comprises purging excess hydrogen and/or supplying additional hydrogen from hydrogen producing units other than those units mentioned before, i.e. other units not being a part of the circle or loop as mentioned before.

According to a preferred embodiment the present process further comprises feeding the effluents from the hydrogen consuming process units to a separating unit and separating the effluents from the separating unit into a lights fraction, a C2 fraction, a C3 fraction and a C4 fraction.

The present process further comprises feeding the C2 fraction to the steam cracking unit, the C3 fraction to the propane dehydrogenation unit and the C4 fraction to the butane dehydrogenation unit, respectively.

In order to obtain valuable hydrocarbon product streams it is preferred to separate the effluents from the hydrogen consuming process units into a BTXE containing stream and a lights fraction stream, and feeding the lights fraction stream to the separating unit.

From a hydrogen economics perspective it is preferred to recover hydrogen from one or more of the effluents chosen from the group of steam cracking unit, propane dehydrogenation unit and butane dehydrogenation unit.

According to a specific embodiment the present method further comprises feeding said C3 fraction and/or said C4 fraction to said LPG aromatization unit. In addition, in some embodiments it is preferred to feed a crude oil fraction, for example a SR-naphtha and/or naphtha products from any hydrocracking unit, (partly) to a catalytic naphtha reformer unit for producing hydrogen, wherein the hydrogen thus produced is preferably sent to a hydrogen consuming unit.

The term "crude oil" as used herein refers to the petroleum extracted from geologic formations in its unrefined form. The term crude oil will also be understood to include crude oil which has been subjected to water-oil separations and/or gas-oil separation and/or desalting and/or stabilization. Any crude oil is suitable as the source material for the process of this invention, including Arabian Heavy, Arabian Light, other Gulf crudes, Brent, North Sea crudes, North and West African crudes, Indonesian, Chinese crudes and mixtures thereof, but also shale oil, tar sands, gas condensates and bio-based oils. The crude oil used as feed to the process of the present invention preferably is conventional petroleum having an API gravity of more than 20° API as measured by the ASTM D287 standard. More preferably, the crude oil used in the process of the present invention is a light crude oil having an API gravity of more than 30° API. Most preferably, the crude oil used in the process of the present invention comprises Arabian Light Crude Oil. Arabian Light Crude Oil typically has an API gravity of between 32-36° API and a sulphur content of between 1.5-4.5 wt.-%.

The term "petrochemicals" or "petrochemical products" as used herein relates to chemical products derived from crude oil that are not used as fuels. Petrochemical products include olefins and aromatics that are used as a basic feedstock for producing chemicals and polymers. High-value petrochemicals include olefins and aromatics. Typical high-value olefins include, but are not limited to, ethylene, propylene, butadiene, butylene-1, isobutylene, isoprene, cyclopentadiene and styrene. Typical high-value aromatics include, but are not limited to, benzene, toluene, xylene and ethyl benzene.

The term "fuels" as used herein relates to crude oil-derived products used as energy carrier. Unlike petrochemicals, which are a collection of well-defined compounds, fuels typically are complex mixtures of different hydrocarbon compounds. Fuels commonly produced by oil refineries include, but are not limited to, gasoline, jet fuel, diesel fuel, heavy fuel oil and petroleum coke.

The term "gases produced by the crude distillation unit" or "gases fraction" as used herein refers to the fraction obtained in a crude oil distillation process that is gaseous at ambient temperatures. Accordingly, the "gases fraction" derived by crude distillation mainly comprises C1-C4 hydrocarbons and may further comprise impurities such as hydrogen sulphide and carbon dioxide. In this specification, other petroleum fractions obtained by crude oil distillation are referred to as "naphtha", "kerosene", "gasoil" and "resid". The terms naphtha, kerosene, gasoil and resid are used herein having their generally accepted meaning in the field of petroleum refinery processes; see Alfke et al. (2007) Oil Refining, Ullmann's Encyclopaedia of Industrial Chemistry and Speight (2005) Petroleum Refinery Processes, Kirk-Othmer Encyclopaedia of Chemical Technology. In this respect, it is to be noted that there may be overlap between the different crude oil distillation fractions due to the complex mixture of the hydrocarbon compounds comprised in the crude oil and the technical limits to the crude oil distillation process.

Preferably, the term "naphtha" as used herein relates to the petroleum fraction obtained by crude oil distillation having a boiling point range of about 20-200° C., more preferably of about 30-190° C. Preferably, light naphtha is the fraction having a boiling point range of about 20-100° C., more preferably of about 30-90° C. Heavy naphtha preferably has a boiling point range of about 80-200° C., more preferably of about 90-190° C. Preferably, the term "kerosene" as used herein relates to the petroleum fraction obtained by crude oil distillation having a boiling point range of about 180-270° C., more preferably of about 190-260° C. Preferably, the term "gasoil" as used herein relates to the petroleum fraction obtained by crude oil distillation having a boiling point range of about 250-360° C., more preferably of about 260-350° C. Preferably, the term "resid" as used herein relates to the petroleum fraction obtained by crude oil distillation having a boiling point of more than about 340° C., more preferably of more than about 350° C.

As used herein, the term "refinery unit" relates to a section of a petrochemical plant complex for the chemical conversion of crude oil to petrochemicals and fuels. In this respect, it is to be noted that a unit for olefins synthesis, such as a steam cracker, is also considered to represent a "refinery unit". In this specification, different hydrocarbons streams produced by refinery units or produced in refinery unit operations are referred to as: refinery unit-derived gases, refinery unit-derived light-distillate, refinery unit-derived middle-distillate and refinery unit-derived heavy-distillate. Accordingly, a refinery unit-derived distillate is obtained as the result of a chemical conversion followed by a fractionation, e.g. by distillation or by extraction, which is in contrast to a crude oil fraction. The term "refinery unit-derived gases" relates to the fraction of the products produced in a refinery unit that is gaseous at ambient temperatures. Accordingly, the refinery unit-derived gas stream may comprise gaseous compounds such as LPG and methane. Other components comprised in the refinery unit-derived gas stream may be hydrogen and hydrogen sulphide. The terms light-distillate, middle-distillate and heavy-distillate are used herein having their generally accepted meaning in the field of petroleum refinery processes; see Speight, J. G. (2005). In this respect, it is to be noted that there may be overlap between different distillation fractions due to the complex mixture of the hydrocarbon compounds comprised in the product stream produced by refinery unit operations and the technical limits to the distillation process used to separate the different fractions. Preferably, the refinery-unit derived light-distillate is the hydrocarbon distillate obtained in a refinery unit process having a boiling point range of about 20-200° C., more preferably of about 30-190° C. The "light-distillate" is often relatively rich in aromatic hydrocarbons having one aromatic ring. Preferably, the refinery-unit derived middle-distillate is the hydrocarbon distillate obtained in a refinery unit process having a boiling point range of about 180-360° C., more preferably of about 190-350° C. The "middle-distillate" is relatively rich in aromatic hydrocarbons having two aromatic rings. Preferably, the refinery-unit derived heavy-distillate is the hydrocarbon distillate obtained in a refinery unit process having a boiling point of more than about 340° C., more preferably of more than about 350° C. The "heavy-distillate" is relatively rich in hydrocarbons having condensed aromatic rings.

The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The terms "naphthenic hydrocarbons" or "naphthenes" or "cycloalkanes" is used herein having its established meaning and accordingly relates types of alkanes that have one or more rings of carbon atoms in the chemical structure of their molecules.

The term "olefin" is used herein having its well-established meaning. Accordingly, olefin relates to an unsaturated hydrocarbon compound containing at least one carbon-carbon double bond. Preferably, the term "olefins" relates to a mixture comprising two or more of ethylene, propylene, butadiene, butylene-1, isobutylene, isoprene and cyclopentadiene.

The term "LPG" as used herein refers to the well-established acronym for the term "liquefied petroleum gas". LPG generally consists of a blend of C2-C4 hydrocarbons i.e. a mixture of C2 and C4 hydrocarbons.

The one of the petrochemical products produced in the process of the present invention is BTX. The term "BTX" as used herein relates to a mixture of benzene, toluene and xylenes. Preferably, the product produced in the process of the present invention comprises further useful aromatic hydrocarbons such as ethyl benzene. Accordingly, the present invention preferably provides a process for producing a mixture of benzene, toluene xylenes and ethyl benzene ("BTXE"). The product as produced may be a physical mixture of the different aromatic hydrocarbons or may be directly subjected to further separation, e.g. by distillation, to provide different purified product streams. Such purified product stream may include a benzene product stream, a toluene product stream, a xylene product stream and/or an ethyl benzene product stream.

As used herein, the term "C# hydrocarbons", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C5+ hydrocarbons" is meant to describe a mixture of hydrocarbons having 5 or more carbon atoms. The term "C5+ alkanes" accordingly relates to alkanes having 5 or more carbon atoms.

As used herein, the term "gasoline hydrocracking" or "GHC" refers to a hydrocracking process that is particularly suitable for converting a complex hydrocarbon feed that is relatively rich in aromatic hydrocarbon compounds—such as FCC gasoline- to LPG and BTX, wherein said process is optimized to keep one aromatic ring intact of the aromatics comprised in the GHC feed stream, but to remove most of the side-chains from said aromatic ring. Accordingly, the main product produced by gasoline hydrocracking is BTX and the process can be optimized to provide chemicals-grade BTX. Preferably, the hydrocarbon feed that is subject to gasoline hydrocracking further comprises light-distillate. More preferably, the hydrocarbon feed that is subjected to gasoline hydrocracking preferably does not comprise more than 1 wt.-% of hydrocarbons having more than one aromatic ring. Preferably, the gasoline hydrocracking conditions include a temperature of 300-580° C., more preferably of 400-580° C. and even more preferably of 430-530° C. Lower temperatures must be avoided since hydrogenation of the aromatic ring becomes favourable, unless a specifically adapted hydrocracking catalyst is employed. For instance, in case the catalyst comprises a further element that reduces the hydrogenation activity of the catalyst, such as tin, lead or bismuth, lower temperatures may be selected for gasoline hydrocracking; see e.g. WO 02/44306 A1 and WO 2007/055488. In case the reaction temperature is too high, the yield of LPG's (especially propane and butanes) declines and the yield of methane rises. As the catalyst activity may decline over the lifetime of the catalyst, it is advantageous to increase the reactor temperature gradually over the life time of the catalyst to maintain the hydrocracking conversion rate. This means that the optimum temperature at the start of an operating cycle preferably is at the lower end of the hydrocracking temperature range. The optimum reactor temperature will rise as the catalyst deactivates so that at the end of a cycle (shortly before the catalyst is replaced or regenerated) the temperature preferably is selected at the higher end of the hydrocracking temperature range.

Preferably, the gasoline hydrocracking of a hydrocarbon feed stream is performed at a pressure of 0.3-5 MPa gauge, more preferably at a pressure of 0.6-3 MPa gauge, particularly preferably at a pressure of 1-2 MPa gauge and most preferably at a pressure of 1.2-1.6 MPa gauge. By increasing reactor pressure, conversion of C5+ non-aromatics can be increased, but this also increases the yield of methane and the hydrogenation of aromatic rings to cyclohexane species which can be cracked to LPG species. This results in a reduction in aromatic yield as the pressure is increased and, as some cyclohexane and its isomer methyl cyclopentane, are not fully hydrocracked, there is an optimum in the purity of the resultant benzene at a pressure of 1.2-1.6 MPa.

Preferably, gasoline hydrocracking of a hydrocarbon feed stream is performed at a Weight Hourly Space Velocity (WHSV) of 0.1-20 h-1, more preferably at a Weight Hourly Space Velocity of 0.2-15 h-1 and most preferably at a Weight Hourly Space Velocity of 0.4-10 h-1. When the space velocity is too high, not all BTX co-boiling paraffin components are hydrocracked, so it will not be possible to achieve BTX specification by simple distillation of the reactor product. At too low space velocity the yield of methane rises at the expense of propane and butane. By selecting the optimal Weight Hourly Space Velocity, it was surprisingly found that sufficiently complete reaction of the benzene co-boilers is achieved to produce on spec BTX without the need for a liquid recycle.

As used herein, the term "feed hydrocracking unit" or "FHC" refers to a refinery unit for performing a hydrocracking process suitable for converting a complex hydrocarbon feed that is relatively rich in naphthenic and paraffinic hydrocarbon compounds—such as straight run cuts including, but not limited to, naphtha- to LPG and alkanes. Preferably, the hydrocarbon feed that is subject to feed hydrocracking comprises naphtha. Accordingly, the main product produced by feed hydrocracking is LPG that is to be converted into olefins (i.e. to be used as a feed for the conversion of alkanes to olefins). The FHC process may be optimized to keep one aromatic ring intact of the aromatics comprised in the FHC feed stream, but to remove most of the side-chains from said aromatic ring. In such a case, the process conditions to be employed for FHC are comparable to the process conditions to be used in the GHC process as described herein above. Alternatively, the FHC process can be optimized to open the aromatic ring of the aromatic hydrocarbons comprised in the FHC feed stream. This can be achieved by modifying the GHC process as described herein by increasing the hydrogenation activity of the catalyst, optionally in combination with selecting a lower process temperature, optionally in combination with a reduced space velocity. In such a case, preferred feed hydrocracking conditions thus include a temperature of 300-550° C., a pressure of 300-5000 kPa gauge and a Weight Hourly Space Velocity of 0.1-10 h-1. More preferred feed hydrocracking conditions include a temperature of 300-450° C., a pressure of 300-5000 kPa gauge and a Weight Hourly Space Velocity of 0.1-10 h-1. Even more preferred FHC conditions optimized to the ring-opening of aromatic hydrocarbons include a temperature of 300-400° C., a pressure of 600-3000 kPa gauge and a Weight Hourly Space Velocity of 0.2-2 h-1.

The process of the present invention (may) involve(s) aromatic ring opening, which comprises contacting middle and heavy distillates in the presence of hydrogen with an aromatic ring opening catalyst under aromatic ring opening conditions. The process conditions useful in aromatic ring opening, also described herein as "aromatic ring opening conditions", can be easily determined by the person skilled in the art; see U.S. Pat. No. 7,513,988.

The term "aromatic ring opening" is used herein in its generally accepted sense and thus may be defined as a process to convert a hydrocarbon feed that is relatively rich in hydrocarbons having condensed aromatic rings, such as cycle oil, to produce a product stream comprising a light-distillate that is relatively rich in BTX (ARO-derived gasoline) and preferably LPG. Such an aromatic ring opening process (ARO process) is for instance described in U.S. Pat. No. 7,513,988. Accordingly, the ARO process may comprise aromatic ring saturation at a temperature of 100-500° C., preferably 200-500° C., more preferably 300-500° C., a pressure of 2-10 MPa together with 1-30 wt.-%, preferably 5-30 wt.-% of hydrogen (in relation to the hydrocarbon feedstock) in the presence of an aromatic hydrogenation catalyst and ring cleavage at a temperature of 200-600° C., preferably 300-400° C., a pressure of 1-12 MPa together with 1-20 wt.-% of hydrogen (in relation to the hydrocarbon feedstock) in the presence of a ring cleavage catalyst, wherein said aromatic ring saturation and ring cleavage may be performed in one reactor or in two consecutive reactors. The aromatic hydrogenation catalyst may be a conventional hydrogenation/hydrotreating catalyst such as a catalyst comprising a mixture of Ni, W and Mo on a refractory support, typically alumina. The ring cleavage catalyst comprises a transition metal or metal sulphide component and a support. Preferably the catalyst comprises one or more elements selected from the group consisting of Pd, Rh, Ru, Ir, Os, Cu, Co, Ni, Pt, Fe, Zn, Ga, In, Mo, W and V in metallic or metal sulphide form supported on an acidic solid such as alumina, silica, alumina-silica and zeolites. In this respect, it is to be noted that the term "supported on" as used herein includes any conventional way of to provide a catalyst which combines one or more elements with a catalyst support. By adapting either single or in combination the catalyst composition, operating temperature, operating space velocity and/or hydrogen partial pressure, the process can be steered towards full saturation and subsequent cleavage of all rings or towards keeping one aromatic ring unsaturated and subsequent cleavage of all but one ring. In the latter case, the ARO process produces a light-distillate ("ARO-gasoline") which is relatively rich in hydrocarbon compounds having one aromatic ring. In the context of the present invention, it is preferred to use an aromatic ring opening process that is optimized to keep one aromatic ring intact and thus to produce a light-distillate which is relatively rich in hydrocarbon compounds having one aromatic ring.

The process of the present invention (may) involve(s) aromatization, which comprises contacting the LPG with an aromatization catalyst under aromatization conditions. The process conditions useful for aromatization, also described herein as "aromatization conditions", can be easily determined by the person skilled in the art; see Encyclopaedia of Hydrocarbons (2006) Vol. II, Chapter 10.6, p. 591-614.

The term "aromatization" is used herein in its generally accepted sense and thus may be defined as a process to convert aliphatic hydrocarbons to aromatic hydrocarbons. There are many aromatization technologies described in the prior art using C3-C8 aliphatic hydrocarbons as raw material; see e.g. U.S. Pat. No. 4,056,575; U.S. Pat. No. 4,157,356; U.S. Pat. No. 4,180,689; Micropor. Mesopor. Mater 21, 439; WO 2004/013095 A2 and WO 2005/08515 A1. Accordingly, the aromatization catalyst may comprise a zeolite, preferably selected from the group consisting of ZSM-5 and zeolite L and may further comprising one or more elements selected from the group consisting of Ga, Zn, Ge and Pt. In case the feed mainly comprises C3-C5 aliphatic hydrocarbons, an acidic zeolite is preferred. As used herein, the term "acidic zeolite" relates to a zeolite in its default, protonic form. In case the feed mainly comprises C6-C8 hydrocarbons a non-acidic zeolite preferred. As used herein, the term "non-acidic zeolite" relates to a zeolite that is base-exchanged, preferably with an alkali metal or alkaline earth metals such as cesium, potassium, sodium, rubidium, barium, calcium, magnesium and mixtures thereof, to reduce acidity. Base-exchange may take place during synthesis of the zeolite with an alkali metal or alkaline earth metal being added as a component of the reaction mixture or may take place with a crystalline zeolite before or after deposition of a noble metal. The zeolite is base-exchanged to the extent that most or all of the cations associated with aluminium are alkali metal or alkaline earth metal. An example of a monovalent base:aluminum molar ratio in the zeolite after base exchange is at least about 0.9. Preferably, the catalyst is selected from the group consisting of HZSM-5 (wherein HZSM-5 describes ZSM-5 in its protonic form), Ga/HZSM-5, Zn/HZSM-5 and Pt/GeHZSM-5. The aromatization conditions may comprise a temperature of 450-550° C., preferably 480-520° C. a pressure of 100-1000 kPa gauge, preferably 200-500 kPa gauge, and a Weight Hourly Space Velocity (WHSV) of 0.1-20 h-1, preferably of 0.4-4 h-1.

Preferably, the aromatization comprises contacting the LPG with an aromatization catalyst under aromatization conditions, wherein the aromatization catalyst comprises a zeolite selected from the group consisting of ZSM-5 and zeolite L, optionally further comprising one or more elements selected from the group consisting of Ga, Zn, Ge and Pt and wherein the aromatization conditions comprise a temperature of 400-600° C., preferably 450-550° C., more preferably 480-520° C. a pressure of 100-1000 kPa gauge, preferably 200-500 kPa gauge, and a Weight Hourly Space Velocity (WHSV) of 0.1-20 h-1, preferably of 0.4-4 h-1.

The process of the present invention (may) involve(s) coking, which comprises subjecting a coker feed stream to coking conditions. The process conditions useful in coking, also described herein as "coking conditions", can be easily determined by the person skilled in the art; see e.g. Alfke et al. (2007). The term "coking" is used herein in its generally accepted sense and thus may be defined as a (non-catalytic) process to convert heavy hydrocarbon feed stream, which preferably is selected from the group consisting of atmospheric resid and vacuum resid feed, into a gaseous hydrocarbon product comprising methane and C2-C4 hydrocarbons, coker naphtha, coker gas oil and petroleum coke by heating the feed to its thermal cracking temperature; see Alfke et al. (2007) Oil Refining, Ullmann's Encyclopaedia of Industrial Chemistry; U.S. Pat. No. 4,547,284 and US 20070108036. The C2-C4 hydrocarbons fraction produced by coking is a mixture of paraffins and olefins. As used herein, the term "coker naphtha" relates to the light-distillate produced by coking that is relatively rich in mono-aromatic hydrocarbons. As used herein, the term "coker gasoil" relates to the middle-distillate, and optionally also the heavy-distillate, produced by coking that is relatively rich in aromatic hydrocarbons having two or more condensed aromatic rings. One form of coking is "delayed coking" which comprises introducing the heavy hydrocarbon feed stream to a fractionator where cracked vapours are condensed. The fractionator bottom product is subsequently heated in a furnace to a temperature of 450-550° C., and the cracked furnace effluent flows through one of the coke drums in which coke is being formed and deposited. The cracked vapours from the coke drum may be separated further in a fractionator. The coke drums are alternately in use to allow coke removal. A further form of coking is "fluidized coking", which, in contrast to the delayed coking process, allows continuous operation. Fluidized coking comprises performing the cracking reaction in reactor in a fluid bed of coke particles into which the heavy hydrocarbon feed stream is injected. Coke fines are removed from the cracked vapours in cyclone separators before fractionation. The coke formed in the reactor may flow continuously to a heater, where it is heated to a temperature of 550-700° C. by partial combustion in a fluid bed, from where the net coke production is withdrawn. Another part of the heated coke particles is returned to the reactor to provide process heat.

Preferably, the coking comprises subjecting the coker feed stream to coking conditions, wherein the coking conditions comprise a temperature of 450-700° C. and a pressure of 50-800 kPa absolute.

The coker naphtha produced in the process of the present invention is relatively rich in olefins and diolefins. Preferably, said olefins and diolefins are separated from other hydrocarbons comprised in the coker naphtha by extraction; see e.g. U.S. Pat. No. 7,019,188. The accordingly separated olefins may be subjected to aromatization.

The process of the present invention may involve pyrolysis in which saturated hydrocarbons comprised in the pyrolysis feed stream are broken down into smaller, often unsaturated, hydrocarbons. A very common process for pyrolysis of hydrocarbons involves "steam cracking". As used herein, the term "steam cracking" relates to a petrochemical process in which saturated hydrocarbons, such as ethane, are converted into unsaturated hydrocarbons such as ethylene. In steam cracking the gasified pyrolysis feed stream is diluted with steam and briefly heated in a furnace without the presence of oxygen. Typically, the reaction temperature is 750-900° C. and the reaction is only allowed to take place very briefly, usually with residence times of 50-1000 milliseconds. Preferably, a relatively low process pressure is to be selected of atmospheric up to 175 kPa gauge. The steam to hydrocarbon weight ratio preferably is 0.1-1.0, more preferably 0.3-0.5. After the cracking temperature has been reached, the gas is quickly quenched to stop the reaction in a transfer line heat exchanger or inside a quenching header using quench oil. Steam cracking results in the slow deposition of coke, a form of carbon, on the reactor walls. Decoking requires the furnace to be isolated from the process and then a flow of steam or a steam/air mixture is passed through the furnace coils. This converts the hard solid carbon layer to carbon monoxide and carbon dioxide. Once this reaction is complete, the furnace is returned to service. The products produced by steam cracking depend on the composition of the feed, the hydrocarbon to steam ratio and on the cracking temperature and furnace residence time.

Preferably, the pyrolysis comprises heating the pyrolysis feed stream in the presence of steam to temperature of 750-900° C. with residence time of 50-1000 milliseconds at a pressure of atmospheric to 175 kPa gauge.

The process of the present invention may comprise resid upgrading, which is a process for breaking the hydrocarbons comprised in the resid and/or refinery unit-derived heavy-distillate into lower boiling point hydrocarbons; see Alfke et al. (2007) Oil Refining, Ullmann's Encyclopaedia of Industrial Chemistry. As used herein, the term "resid upgrading unit" relates to a refinery unit suitable for the process of resid upgrading. Commercially available technologies include a delayed coker, a fluid coker, a resid FCC, a Flexicoker, a visbreaker or a catalytic hydrovisbreaker. Preferably, the resid upgrading unit may be a coking unit or a resid hydrocracker. A "coking unit" is an oil refinery processing unit that converts resid into LPG, light-distillate, middle-distillate, heavy-distillate and petroleum coke. The process thermally cracks the long chain hydrocarbon molecules in the residual oil feed into shorter chain molecules.

The feed to resid upgrading preferably comprises resid and heavy-distillate produced in the process. Such heavy-distillate may comprise the heavy-distillate produced by a steam cracker, such as carbon black oil and/or cracked distillate but may also comprise the heavy-distillate produced by resid upgrading, which may be recycled to extinction. Yet, a relatively small pitch stream may be purged from the process. Preferably, the resid upgrading used in the process of the present invention is resid hydrocracking. By selecting resid hydrocracking over other means for resid upgrading, the carbon efficiency of the process of the present invention can be further improved.

A "resid hydrocracker" is an oil refinery processing unit that is suitable for the process of resid hydrocracking, which is a process to convert resid into LPG, light-distillate, middle-distillate and heavy-distillate. Resid hydrocracking processes are well known in the art; see e.g. Alfke et al. (2007). Accordingly, 3 basic reactor types are employed in commercial hydrocracking which are a fixed bed (trickle bed) reactor type, an ebullated bed reactor type and slurry (entrained flow) reactor type. Fixed bed resid hydrocracking processes are well-established and are capable of processing contaminated streams such as atmospheric residues and vacuum residues to produce light- and middle-distillate which can be further processed to produce olefins and aromatics. The catalysts used in fixed bed resid hydrocracking processes commonly comprise one or more elements selected from the group consisting of Co, Mo and Ni on a refractory support, typically alumina. In case of highly contaminated feeds, the catalyst in fixed bed resid hydrocracking processes may also be replenished to a certain extend (moving bed). The process conditions commonly comprise a temperature of 350-450° C. and a pressure of 2-20 MPa gauge. Ebullated bed resid hydrocracking processes are also well-established and are inter alia characterized in that the catalyst is continuously replaced allowing the processing of highly contaminated feeds. The catalysts used in ebullated bed resid hydrocracking processes commonly comprise one or more elements selected from the group consisting of Co, Mo and Ni on a refractory support, typically alumina. The small particle size of the catalysts employed effectively increases their activity (c.f. similar formulations in forms suitable for fixed bed applications). These two factors allow ebullated hydrocracking processes to achieve significantly higher yields of light products and higher levels of hydrogen addition when compared to fixed bed hydrocracking units. The process conditions commonly comprise a temperature of 350-450° C. and a pressure of 5-25 MPa gauge. Slurry resid hydrocracking processes represent a combination of thermal cracking and catalytic hydrogenation to achieve high yields of distillable products from highly contaminated resid feeds. In the first liquid stage, thermal cracking and hydrocracking reactions occur simultaneously in the fluidized bed at process conditions that include a temperature of 400-500° C. and a pressure of 15-25 MPa gauge. Resid, hydrogen and catalyst are introduced at the bottom of the reactor and a fluidized bed is formed, the height of which depends on flow rate and desired conversion. In these processes catalyst is continuously replaced to achieve consistent conversion levels through an operating cycle. The catalyst may be an unsupported metal sulphide that is generated in situ within the reactor. In practice the additional costs associated with the ebullated bed and slurry phase reactors are only justified when a high conversion of highly contaminated heavy streams such as vacuum gas oils is required. Under these circumstances the limited conversion of very large molecules and the difficulties associated with catalyst deactivation make fixed bed processes relatively unattractive in the process of the present invention. Accordingly, ebullated bed and slurry reactor types are preferred due to their improved yield of light- and middle-distillate when compared to fixed bed hydrocracking. As used herein, the term "resid upgrading liquid effluent" relates to the product produced by resid upgrading excluding the gaseous products, such as methane and LPG, and the heavy-distillate produced by resid upgrading. The heavy-distillate produced by resid upgrading is preferably recycled to the resid upgrading unit until extinction. However, it may be necessary to purge a relatively small pitch stream. From the viewpoint of carbon efficiency, a resid hydrocracker is preferred over a coking unit as the latter produces considerable amounts of petroleum coke that cannot be upgraded to high value petrochemical products. From the viewpoint of the hydrogen balance of the integrated process, it may be preferred to select a coking unit over a resid hydrocracker as the latter consumes considerable amounts of hydrogen. Also in view of the capital expenditure and/or the operating costs it may be advantageous to select a coking unit over a resid hydrocracker.

As used herein, the term "catalytic reformer unit" relates to a refinery unit in which hydrocarbon molecules in a naphtha and/or light-distillate feedstream is reacted to convert naphthenes and paraffins to a light distillate that is rich in aromatics ("reformer gasoline"); see Alfke (2007) loc. cit. In the catalytic reforming process hydrocarbons are dehydrogenated to produce significant amounts of byproduct hydrogen gas. Other byproducts are methane and LPG. Generally, catalytic reforming is performed using a supported catalyst comprising a hydrogenation metal, preferably platinum, and a halogen, preferably chlorine, which catalyses isomerization and cracking reactions. Process conditions suitable for catalytic reforming commonly comprise a process temperature of 400-600° C. and a pressure of 0.5-5 MPa gauge.

The term "propane dehydrogenation unit" as used herein relates to a petrochemical process unit wherein a propane feedstream is converted into a product comprising propylene and hydrogen. Accordingly, the term "butane dehydrogenation unit" relates to a process unit for converting a butane feedstream into C4 olefins. Together, processes for the dehydrogenation of lower alkanes such as propane and butanes are described as lower alkane dehydrogenation process. Processes for the dehydrogenation of lower alkanes are well-known in the art and include oxidative hydrogenation processes and non-oxidative dehydrogenation processes. In an oxidative dehydrogenation process, the process heat is provided by partial oxidation of the lower alkane(s) in the feed. In a non-oxidative dehydrogenation process, which is preferred in the context of the present invention, the process heat for the endothermic dehydrogenation reaction is provided by external heat sources such as hot flue gases obtained by burning of fuel gas or steam. For instance, the UOP Oleflex process allows for the dehydrogenation of propane to form propylene and of (iso)butane to form (iso)butylene (or mixtures thereof) in the presence of a catalyst containing platinum supported on alumina in a moving bed reactor; see e.g. U.S. Pat. No. 4,827,072. The Uhde STAR process allows for the dehydrogenation of propane to form propylene or of butane to form butylene in the presence of a promoted platinum catalyst supported on a zinc-alumina spinel; see e.g. U.S. Pat. No. 4,926,005. The STAR process has been recently improved by applying the principle of oxydehydrogenation. In a secondary adiabatic zone in the reactor part of the hydrogen from the intermediate product is selectively converted with added oxygen to form water. This shifts the thermodynamic equilibrium to higher conversion and achieve higher yield. Also the external heat required for the endothermic dehydrogenation reaction is partly supplied by the exothermic hydrogen conversion. The Lummus Catofin process employs a number of fixed bed reactors operating on a cyclical basis. The catalyst is activated alumina impregnated with 18-20 wt-% chromium; see e.g. EP 0192 059 A1 and GB 2 162 082 A. The Catofin process is reported to be robust and capable of handling impurities which would poison a platinum catalyst. The products produced by a butane dehydrogenation process depends on the nature of the butane feed and the butane dehydrogenation process used. Also the Catofin process allows for the dehydrogenation of butane to form butylene; see e.g. U.S. Pat. No. 7,622,623.

BRIEF DESCRIPTION OF THE DRAWINGS

The present invention will be described in further detail below and in conjunction with the attached drawings in which the same or similar elements are referred to by the same number.

DETAILED DESCRIPTION OF THE INVENTION

Figure 1:
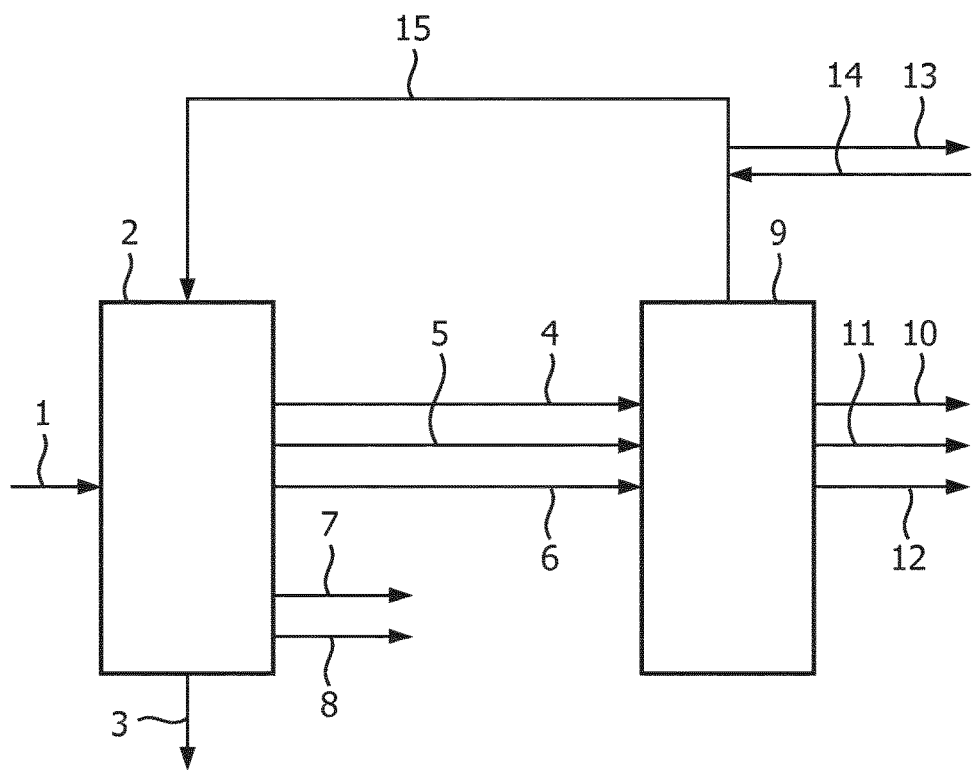
FIG. 1 is a schematic illustration of the present invention.

Referring now to the process and apparatus schematically depicted in FIG. 1, there is shown a process flow diagram according to the invention. Crude oil fraction 1 is used as a feedstock for one or more hydrogen consuming units, identified with reference number 2. The block 2 comprises one or more units chosen from the group of feed hydrocracking unit, gasoil hydrocracking unit, aromatic ring opening unit, resid hydrocracking unit, gasoline hydrocracker unit, hydrodesulphurization unit, hydro-dearomatization unit and hydro-dealkylation unit. The hydrogen consuming units 2 produce one or more streams 4, 5, 6, 7, and 8, e.g. streams comprising mainly ethane, propane, butanes, methane and BTX, respectively. Crude oil fraction 1 is used here as a feed for the hydrogen consuming process units 2, wherein at least 25 wt. % of feed 1 is converted into a low boiling hydrocarbon fraction comprising ethane, propane and butanes. According to this embodiment hydrocracking units 2 may produce a pitch containing stream 3 as well. Streams 4, 5, 6 are sent to one or more hydrogen producing units, identified with reference number 9. The block 9 comprises one or more units chosen from the group steam cracking unit, propane dehydrogenation unit (PDH), butane dehydrogenation unit (BDH), combined PDH and BDH unit, catalytic naphtha reformer unit and LPG aromatization unit. Hydrogen producing units, identified with reference number 9, produce, inter alia, streams 10, 11 and 12. Streams 10, 11 and 12 comprise methane, olefins and aromatics, respectively. Hydrogen producing units 9 also produce a stream 15 containing hydrogen. Stream 15 originating from hydrogen producing units 9 is integrated into the hydrogen consuming units 2. In some embodiments hydrogen produced in units 9 is sent, via line 13, to other units, i.e. not to units 2. In other embodiments deficiency of hydrogen is solved by the supply of hydrogen via line 13. In an embodiment units 2 may comprise a naphtha reformer, especially when there is an urgent need for hydrogen since such a naphtha reformer produces hydrogen, which hydrogen can be used in, for example, a hydrocracking unit. For the person skilled in the art it is clear that purification and compression of the hydrogen stream(s) is needed. From the viewpoint of legibility these process steps and process units have been omitted here.

Figure 2:
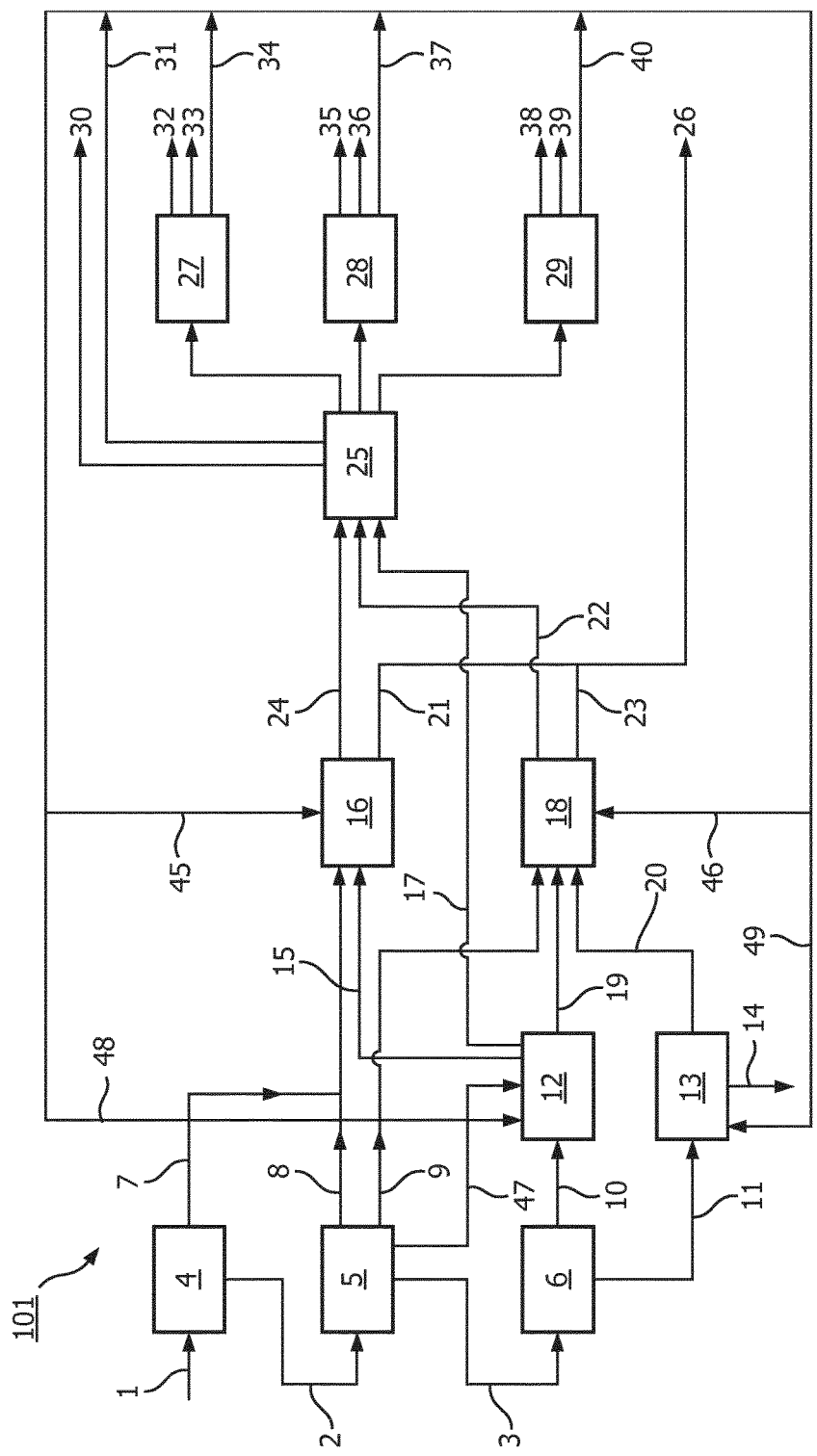
FIG. 2 is a schematic illustration of a more detailed embodiment of the invention.

Referring now to the process and apparatus schematically depicted in FIG. 2, there is shown a process flow diagram 101 for converting hydrocarbons into olefins and BTXE, wherein the converting process comprises the integration of hydrogen consuming process units with hydrogen producing units.

Crude oil fraction 1 is sent to a distillation unit 4 of the type CDU pre-flash and produces a light stream 7, comprising SR-lights+SR light naphtha and a bottom stream 2. Bottom stream 2 is sent to atmospheric distillation unit 5 producing stream 8 comprising SR-heavy naphtha, stream 47 comprising atmospheric gasoil (AGO) and a stream 9, comprising SR-kerosene and diesel. Bottom stream 3 coming from atmospheric distillation 5 is sent to a vacuum distillation unit 6 producing a stream 10, comprising vacuum gas oil and a stream 11, comprising vacuum resid. Stream 10 and stream 47 are sent to a hydrocracking unit 12 producing a naphtha stream 15, a gaseous stream 17, comprising hydrocracking lights, a stream 19 comprising hydrocracking middle distillates. Stream 11 is further treated in resid hydrocracker 13 producing stream 14, comprising pitch and a stream 20. Stream 9, stream 19 and stream 20 are further treated in a hydrocracking unit 18, also identified as an aromatic ring opening+gasoline hydrocracker. Hydrocracking unit 18 produces stream 22 comprising LPG+lights and a stream 23 comprising BTXE. Streams 7, 8 and stream 15 are sent to a hydrocracking unit 16, also identified as a feed hydrocracker, producing stream 24, comprising LPG+ lights and a stream 21, comprising BTXE. Stream 17, stream 24 and stream 22 are sent to a gas separation unit 25 producing stream 30, comprising CH4, a stream 31, comprising H2. An ethane rich stream coming from gas separation unit 25 is sent to steam cracking unit 27 producing stream 32, comprising olefins and aromatics, stream 33, comprising CH4 and stream 34, comprising H2. A propane rich stream coming from gas separation unit 25 is sent to propane dehydrogenation unit 28 producing stream 35, comprising propylene, stream 36, comprising CH4 and stream 37, comprising H2. A stream rich in n-butane and i-butane coming from gas separation unit 25 is sent to butane dehydrogenation unit 29 producing stream 38, comprising butylene, stream 39, comprising CH4 and stream 40, comprising H2. Stream 21 rich in BTXE and stream 23 rich in BTXE are mixed and sent as stream 26 for further processing.

In FIG. 2 the hydrogen producing units, i.e. steam cracking unit 27, propane dehydrogenation unit 28 and butane dehydrogenation unit 29 provide the necessary hydrogen for the hydrocracking units 12, 13, 16, 18. In addition, gas separation unit 25 also provides a stream 31 rich in hydrogen, which stream 31 can be sent to hydrogen consuming units 12, 13, 16, 18, as well. Hydrogen comprising streams 31, 34, 37, and 40 are sent via lines 45, 46, 48, 49 to hydrocracking units 16, 18, 12, 13.

Figure 3:
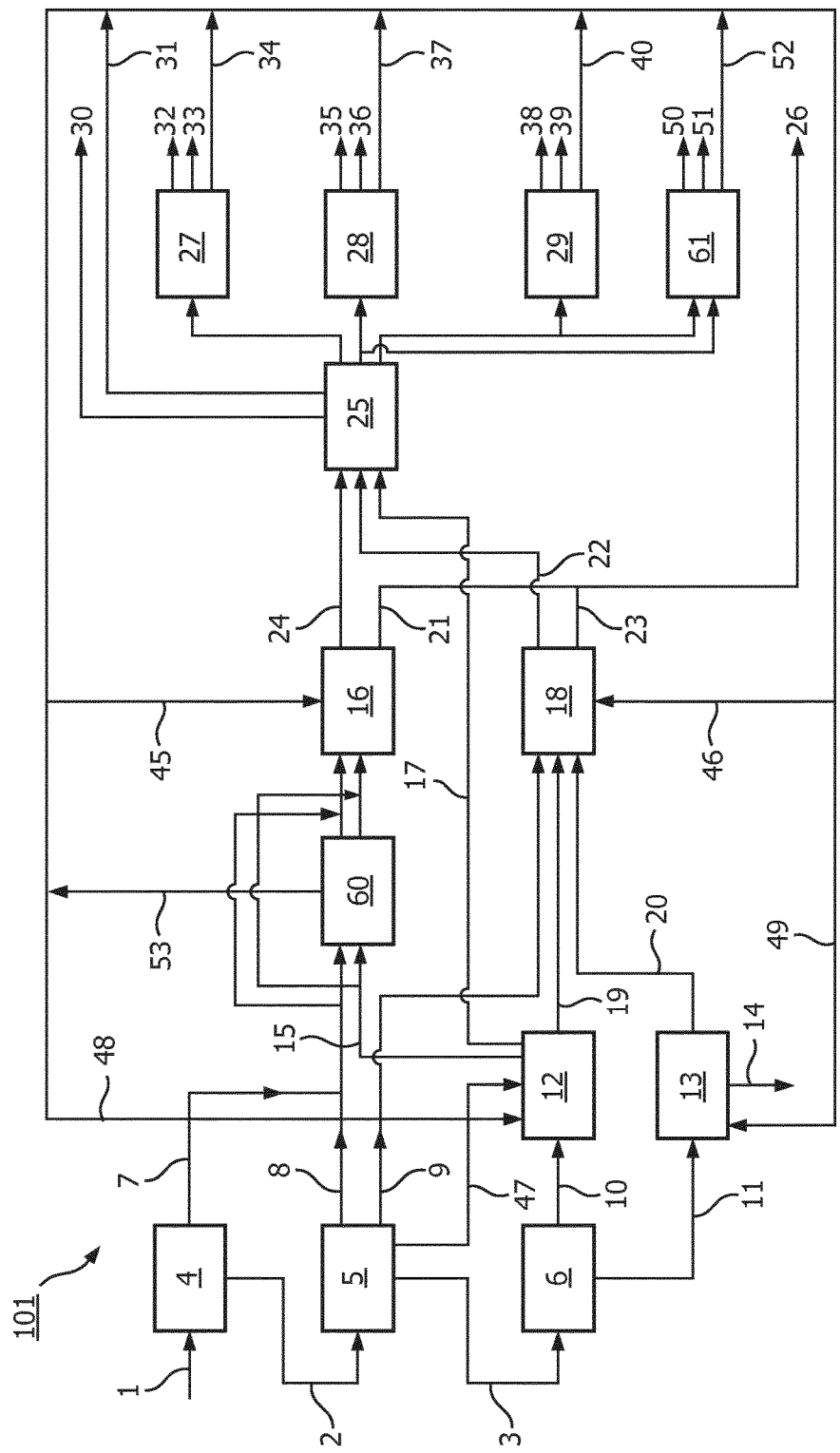
FIG. 3 is a schematic illustration of a more detailed embodiment of the invention.

FIG. 3 differs from the process shown in FIG. 2 basically in the presence of additional units 60, 61. Unit 60 is a catalytic reformer and produces a hydrogen containing stream 53. As shown in this FIG. 3, it is also possible to by pass unit 60 which means that streams 8, 15 are sent directly to unit 16. Unit 61 is a LPG-aromatization unit wherein a part of the propane and butane is processed in LPG-aromatization unit 61 instead of propane dehydrogenation unit 28 and butane dehydrogenation unit 29. Unit 61 produces a stream 50, comprising butylene/propylene, stream 51, comprising CH4 and stream 52, comprising H2.

FIG. 3 shows a reformer unit 60 upfront of the hydrocracking unit 16, also identified as a feed hydrocracker. Preferably the feed to the reformer unit 60 needs to be treated first in a HDS unit (hydrodesulferization). Furthermore, there may be a depentanizer unit upfront of the reformer unit 60 to separate C5– from the naphtha entering the catalytic reformer unit 60, this C5– fraction could be sent to the feed hydrocracking unit 16.

EXAMPLES

The present invention will now be more fully described by the following non-limiting Examples.

Comparative Example 1 (According to FIG. 2)

The experimental data as provided herein were obtained by flow sheet modelling in Aspen Plus. The steam cracking kinetics were taken into account rigorously (software for steam cracker product slate calculations). For the feed hydrocracking, a reaction scheme has been used that is based on experimental data. For the aromatic ring opening followed by gasoline hydrocracking a reaction scheme has been used in which all multi aromatic compounds were converted into BTXE (which is an acronym for BTX+ethyl benzene) and LPG (same LPG distribution as feed hydrocracking). The product slates from propane dehydrogenation and butane dehydrogenation were based on literature data. The gasoil hydrocracker unit and the resid hydrocracker were modelled based on data from literature.

In Comparative Example 1, Arabian light crude oil is distilled in an atmospheric distillation and a vacuum distillation unit. The vacuum gasoil fraction of the vacuum distillation is upgraded in a hydrocracker to produce gases, naphtha and middle-distillate. The vacuum residue of the vacuum distillation is upgraded in a resid hydrocracker to produce distillate and pitch (the pitch in the calculations amounts to 2 wt. % of the crude).

The lights and naphtha like stream from the crude distillation and from the VGCO hydrocracker and from the resid hydrocracker are converted in a FHC unit to yield BTXE (product) and LPG (intermediate). Furthermore, the middle and heavy distillates from the crude distillation and from the VGCO hydrocracker and from the resid hydrocracker are subjected to aromatic ring opening that is operated under process conditions to maintain 1 aromatic ring. The effluent from the aromatic ring opening unit is further treated in a GHC unit to yield BTXE (product) and LPG (intermediate).

The LPG from the FHC unit and from the combined aromatic ring opening/gasoline hydrocracker unit is separated into an ethane-, propane- and butane fraction. The ethane is being steam cracked, the propane and butane are being dehydrogenated into propylene and butene (with selectivity of propane to propylene 90%, and n-butane to n-butene of 90% and i-butane to i-butene of 90%).

The results are provided in table 1. Comparative Example 1 has a slightly positive hydrogen balance (H2 release–H2 uptake=0.01 wt. % of the crude). The intermediate LPG product (from the FHC and from the combined aromatic ring opening and GHC unit) is 79.5 wt. % of the crude.

In FIG. 1 the hydrogen consumption and hydrogen production can be controlled by the set points of the flow sheet units, however the hydrogen requirement will also be dependant on the type of crude oil.

Examples of settings which effect the hydrogen production and consumption (not quantified):

Aromatic ring opening unit: by managing space velocity, reactor pressure, reactor temperature, and/or by recycling of a cut of the aromatic products back to the reactor, the product ratio of mono aromatics, di-aromatics and saturated components can be varied, consuming a variable amount of hydrogen.

FHC and GHC: by increasing the space velocity, decreasing reactor pressure and/or reactor temperature, the methane product yield can be varied from a higher methane yield to a lower methane yield. Methane captures a lot of hydrogen, so as a result the less methane present in the product slate, the more hydrogen will be available for high value products (olefins and BTXE).

Cut points of crude fractionation: varying the cut point of naphtha and kerosene determines the ratio of feed to the feed hydro cracker and to the combined aromatic ring opening and GHC unit. The hydrogen consumption in the FHC is a factor 2 lower than hydrogen consumption feed at the aromatic ring opening unit (in tonne hydrogen/tonne feed to the unit). This indicates that shifting the distillation cut point of naphtha and middle distillate to a lower temperature reduces the hydrogen consumption.

Resid Hydrocracker: rejecting more pitch leads to a lower hydrogen requirement

Ethane cracking/PDH/BDH: increasing the severity and/or selectivity of the process will increase the hydrogen generation.

Examples 2 to 5 (According to FIG. 3)

FIG. 3 contains two additional units: a catalytic naphtha reformer (60) and a LPG aromatization unit (61). These units were modelled based on data from literature.

In this flow sheet, the naphtha like streams from the crude distillation and from the VGCO hydrocracker and from the resid hydrocracker may be (partly) treated in a catalytic naphtha reformer before entering the FHC. Alternatively the propane and/or butane intermediate products may be sent (partly) to a LPG aromatization unit rather than dehydrogenation units.

Example 2 is identical to Example 1 except for the following: the lights and naphtha like streams from the crude distillation and from the VGCO hydrocracker and from the resid hydrocracker are separated in a depentanizer of which the C5− fractions is fed to the FHC unit, the C6+ fraction is fed to a catalytic naphtha reformer. The product of this reformer is again fed to the FHC unit (The depentanizer is not shown in FIG. 3).

Example 3 is identical to Example 1 except for the following: the intermediate propane from the FHC and from the combined aromatic ring opening and GHC unit, is not being converted in the PDH unit but instead is being fed to a LPG aromatizing unit.

Example 4 is identical to Example 1 except for the following: the intermediate propane from the FHC and from the combined aromatic ring opening and GHC unit, is not being converted in the PDH unit but instead is being fed to a LPG aromatizing unit. The intermediate butane from the FHC and from the combined aromatic ring opening and GHC unit, is not being converted in the BDH unit but instead is being fed to a LPG aromatizing unit.

Example 5 is identical to Example 1 except for the following: the lights and naphtha like streams from the crude distillation and from the VGCO hydrocracker and from the resid hydrocracker are separated in a depentanizer of which the C5− fractions is fed to the FHC unit, the C6+ fraction is fed to a catalytic naphtha reformer. The product of this reformer is again fed to the FHC unit (The depentanizer is not shown in FIG. 3).

The intermediate propane from the FHC and from the combined aromatic ring opening and GHC unit, is not being converted in the PDH unit but instead is being fed to a LPG aromatizing unit The intermediate butane from the FHC and from the combined aromatic ring opening and GHC unit, is not being converted in the BDH unit but instead is being fed to a LPG aromatizing unit.

Examples 6 to 10 (According to FIG. 3)

Ex. 6=same as Ex. 1 except with crude feed Arabian heavy instead of Arabian light crude oil.
Ex. 7=same as Ex. 2 except with crude feed Arabian heavy instead of Arabian light crude oil.
Ex. 8=same as Ex. 3 except with crude feed Arabian heavy instead of Arabian light crude oil.
Ex. 96=same as Ex. 4 except with crude feed Arabian heavy instead of Arabian light crude oil.
Ex. 10=same as Ex. 5 except with crude feed Arabian heavy instead of Arabian light crude oil.

The examples show that the Hydrogen release−H2 uptake varies in a wide range (in examples 1 to 5 from 0.01 to 1.76 wt. % of crude, in ex. 6 to 10 from −0.89 to 0.81 wt. % of crude).

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Feed | | AL | AL | AL | AL | AL | AH | AH | AH | AH | AH |
| Routing for Naphtha, propane and butane, Unit and unit nr | naphtha | FHC 16 | Reformer 60 | FHC 16 | FHC 16 | Reformer 60 | FHC 16 | Reformer 60 | FHC 16 | FHC 16 | Reformer 60 |
| | C2 | SC 27 | SC 27 | SC 27 | SC 27 | SC 27 | SC 27 | SC 27 | SC 27 | SC 27 | SC 27 |
| | C3 | PDH 28 | PDH 28 | AP 61 | AP 61 | AP 61 | PDH 28 | PDH 28 | AP 61 | AP 61 | AP 61 |
| | C4 | BDH 29 | BDH 29 | BDH 29 | AP 61 | AP 61 | BDH 29 | BDH 29 | BDH 29 | AP 61 | AP 61 |
| H2 release − H2 uptake, wt % of crude | | 0.01 | 0.92 | 0.74 | 0.98 | 1.76 | −0.89 | −0.04 | −0.17 | 0.05 | 0.81 |
| H2 release (wt % of crude) | | | | | | | | | | | |
| Steamcracker | | 1.4 | 6.2 | 11.5 | 12.1 | 9.9 | 8.2 | 6.6 | 11.6 | 12.2 | 10.2 |
| PDH | | 1.9 | 9.5 | 0.0 | 0.0 | 0.0 | 10.9 | 9.7 | 0.0 | 0.0 | 0.0 |
| BDH | | 0.3 | 1.5 | 1.7 | 0.0 | 0.0 | 1.6 | 1.5 | 1.6 | 0.0 | 0.0 |
| Reformer | | 0.0 | 6.8 | 0.0 | 0.0 | 6.8 | 0.0 | 6.1 | 0.0 | 0.0 | 6.1 |
| C3 Cyclar | | 0.0 | 0.0 | 11.6 | 11.6 | 10.1 | 0.0 | 0.0 | 11.5 | 11.5 | 10.2 |
| C4 Cyclar | | 0.0 | 0.0 | 0.0 | 2.3 | 2.1 | 0.0 | 0.0 | 0.0 | 2.2 | 2.1 |
| H2 uptake (wt % of crude) | | | | | | | | | | | |
| HC + RHC | | 0.6 | 3.4 | 3.4 | 3.4 | 3.4 | 7.7 | 7.7 | 7.7 | 7.7 | 7.7 |
| FHC | | 0.6 | 1.8 | 3.6 | 3.6 | 1.8 | 3.2 | 1.6 | 3.2 | 3.2 | 1.6 |
| ARO/GHC | | 2.4 | 2.4 | 2.4 | 2.4 | 2.4 | 2.5 | 2.5 | 2.5 | 2.5 | 2.5 |
| LPG from FHC and from Aromatic ring opening and GHC (wt % of crude) | | | | | | | | | | | |
| Ethane | | 22.7 | 17.7 | 22.7 | 22.7 | 17.7 | 22.2 | 17.9 | 22.2 | 22.2 | 17.9 |
| Propane | | 47.3 | 40.8 | 47.3 | 47.3 | 40.8 | 46.4 | 39.8 | 46.4 | 46.4 | 39.8 |
| n-Butane and i-Butane | | 9.5 | 8.4 | 9.5 | 9.5 | 8.4 | 8.5 | 8.0 | 8.5 | 8.5 | 8.0 |
| Sum LPG (wt % of crude) | | 79.5 | 67.0 | 79.5 | 79.5 | 67.0 | 77.1 | 65.7 | 77.1 | 77.1 | 65.7 |
| Product slate, wt % | | | | | | | | | | | |
| CH4 | | 5.2 | 4.2 | 15.0 | 17.1 | 14.6 | 4.4 | 3.8 | 13.7 | 15.6 | 13.9 |
| C2= | | 21.3 | 17.4 | 27.3 | 28.3 | 23.5 | 20.9 | 17.5 | 26.5 | 27.5 | 23.4 |
| C3= | | 42.5 | 37.0 | 0.9 | 0.7 | 0.6 | 40.7 | 36.4 | 1.0 | 0.9 | 0.8 |
| C4/C5 olefins | | 10.6 | 9.4 | 9.5 | 1.0 | 0.8 | 9.6 | 9.0 | 8.6 | 1.0 | 0.8 |
| Total Olefins | | 74.4 | 63.8 | 37.7 | 30.0 | 24.9 | 71.2 | 62.8 | 36.2 | 29.3 | 25.1 |
| BTXE | | 17.9 | 28.5 | 42.2 | 47.2 | 54.2 | 21.7 | 30.0 | 44.9 | 49.4 | 55.0 |

-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| C9+ | 0.6 | 1.5 | 3.1 | 3.7 | 4.2 | 0.7 | 1.3 | 3.2 | 3.6 | 4.0 |
| Pitch | 2.0 | 2.0 | 2.0 | 2.0 | 2.0 | 2.0 | 2.0 | 2.0 | 2.0 | 2.1 |

In the above Table:
AP=aromatization process, FHC=Feed hydrocracking cracking, GHC=gasoline hydrocracking,
PDH=propane dehydrogenation unit, BDH=butane dehydrogenation unit From the above Table it is clear that Examples 1-2, and 6-7 refer to the process flow diagram shown in FIG. 2, and Examples 3-5, and 8-10 refer to the process flow diagram shown in FIG. 2. The reference numbers mentioned in the boxes refer to the process units shown in the accompanying figures. All Examples clearly include olefins plants in the hydrogen producing units.

The invention claimed is:

1. A method of controlling supply and allocation of hydrogen gas in a hydrogen system of a refinery integrated with olefins and aromatics plants to convert crude oil into petrochemicals, the system comprising one or more supply sources that provide hydrogen at individual rates, purities, pressures and costs, multiple consumption sites that consume hydrogen at individual rates, purities and pressures and an interconnecting hydrogen distribution network, said method comprising the integration of hydrogen consuming process units with hydrogen producing process units, wherein both hydrogen recovered from the effluents from the hydrogen consuming process units and hydrogen recovered from the hydrogen producing process units are re-used in the hydrogen consuming process units, wherein the method comprises the steps of:
  feeding a crude oil fraction together with hydrogen to one or more hydrogen consuming units;
  separating the effluent(s) from said one or more hydrogen consuming units into one or more streams comprising methane, ethane, propane, butane, pitch and BTX;
  feeding said one or more streams comprising ethane, propane and butane to one or more hydrogen producing units to produce hydrogen;
  integrating said stream comprising hydrogen originating from said hydrogen producing units into said hydrogen stream(s) to be fed to said one or more hydrogen consuming units, wherein at least 25 wt. % of said crude oil fraction is converted into a low boiling hydrocarbon fraction comprising ethane, propane and butanes, wherein said hydrogen producing process units comprise a steam cracking unit and one or more units chosen from the group of propane dehydrogenation unit (PDH), butane dehydrogenation unit (BDH) and combined PDH and BDH unit.

2. The method according to claim 1, wherein at least 50 wt % of said feed is converted into a low boiling hydrocarbon fraction comprising ethane, propane and butanes.

3. A method of controlling supply and allocation of hydrogen gas in a hydrogen system of a refinery integrated with olefins and aromatics plants to convert crude oil into petrochemicals, the system comprising one or more supply sources that provide hydrogen at individual rates, purities, pressures and costs, multiple consumption sites that consume hydrogen at individual rates, purities and pressures and an interconnecting hydrogen distribution network, said method comprising the integration of hydrogen consuming process units with hydrogen producing process units, wherein both hydrogen recovered from the effluents from the hydrogen consuming process units and hydrogen recovered from the hydrogen producing process units are re-used in the hydrogen consuming process units, wherein the method comprises the steps of:
  feeding a crude oil fraction together with hydrogen to one or more hydrogen consuming units;
  separating the effluent(s) from said one or more hydrogen consuming units into one or more streams comprising methane, ethane, propane, butane, pitch and BTX;
  feeding said one or more streams comprising ethane, propane and butane to one or more hydrogen producing units for producing one or more streams comprising hydrogen;
  integrating said stream comprising hydrogen originating from said hydrogen producing units into said hydrogen stream(s) to be fed to said one or more hydrogen consuming units, wherein at least 25 wt % of said crude oil fraction is converted into a low boiling hydrocarbon fraction comprising ethane, propane and butanes, wherein said hydrogen producing process units comprise a steam cracking unit and one or more units chosen from the group of propane dehydrogenation unit (PDH), butane dehydrogenation unit (BDH) and combined PDH, a BDH unit, a feed hydrocracking unit, gas oil hydrocracking unit, aromatic ring opening unit, resid hydrocracking unit, gasoline hydrocracker unit, a hydrodesulphurization unit, hydro-dearomatization unit and hydro-dealkylation unit.

4. A method of controlling supply and allocation of hydrogen gas in a hydrogen system of a refinery integrated with olefins and aromatics plants to convert crude oil into petrochemicals, the system comprising one or more supply sources that provide hydrogen at individual rates, purities, pressures and costs, multiple consumption sites that consume hydrogen at individual rates, purities and pressures and an interconnecting hydrogen distribution network, said method comprising the integration of hydrogen consuming process units with hydrogen producing process units, wherein both hydrogen recovered from the effluents from the hydrogen consuming process units and hydrogen recovered from the hydrogen producing process units are re-used in the hydrogen consuming process units, wherein the method comprises the steps of:
  feeding a crude oil fraction together with hydrogen to one or more hydrogen consuming units;
  separating the effluent(s) from said one or more hydrogen consuming units into one or more streams comprising methane, ethane, propane, butane, pitch and BTX;
  feeding said one or more streams comprising ethane, propane and butane to one or more hydrogen producing units for producing one or more streams comprising hydrogen;
  integrating said stream comprising hydrogen originating from said hydrogen producing units into said hydrogen stream(s) to be fed to said one or more hydrogen consuming units, wherein at least 25 wt. % of said crude oil fraction is converted into a low boiling hydrocarbon fraction comprising ethane, propane and butanes, wherein said hydrogen producing process units comprise a steam cracking unit and one or more units chosen from the group of propane dehydrogenation unit (PDH), butane dehydrogenation unit (BDH) and combined PDH, a BDH unit, a catalytic naphtha reformer unit and liquefied petroleum gas (LPO) unit.

5. The method according to claim 1, further comprising setting cut points of one or more separation units, setting operation conditions of hydrogen consuming process units and setting operation conditions of hydrogen producing process units in a process control system, wherein the values of said cut points and operation conditions are such that said supply and allocation of hydrogen gas in a hydrogen system of a refinery is controlled.

6. The method according to claim 1, further comprising purging excess hydrogen and/or supplying additional hydrogen from hydrogen producing units.

7. The method according to claim 1, further comprising feeding said effluent(s) from said hydrogen consuming process units to separating unit(s) and separating the effluents from said separating unit(s) into a lights fraction, a C2 fraction, a C3 fraction and a C4 fraction.

8. The method according to claim 7, further comprising feeding said C2 fraction to said steam cracking unit, said C3 fraction to said propane dehydrogenation unit and said C4 fraction to said butane dehydrogenation unit, respectively.

9. The method according to claim 7, further comprising feeding said C3 fraction and/or said C4 fraction to a said LPG aromatization unit.

10. The method according to claim 1, further comprising feeding a crude oil fraction to a catalytic naphtha reformer unit for producing hydrogen, wherein the hydrogen thus produced is sent to a hydrogen consuming unit.

11. The method according to claim 7, further comprising feeding said C2 fraction to said steam cracking unit.

12. The method according to claim 7, further comprising feeding said C3 fraction to said propane dehydrogenation unit.

13. The method according to claim 7, further comprising feeding said C4 fraction to said butane dehydrogenation unit.

14. The method according to claim 7, further comprising feeding said C3 fraction and said C4 fraction to a LPG aromatization unit.

15. The method according to claim 7, further comprising feeding said C3 fraction to a LPG aromatization unit.

16. The method according to claim 7, further comprising feeding said C4 fraction to a LPG aromatization unit.

17. The method according to claim 1, further comprising feeding a crude oil fraction to a catalytic naphtha reformer unit for producing hydrogen.

18. The method according to claim 1, further comprising supplying additional hydrogen to said hydrogen producing units.

* * * * *